(12) United States Patent
Choi et al.

(10) Patent No.: US 11,287,994 B2
(45) Date of Patent: Mar. 29, 2022

(54) NATIVE KEY-VALUE STORAGE ENABLED DISTRIBUTED STORAGE SYSTEM

(71) Applicant: Samsung Electronics Co., Ltd., Suwon-si (KR)

(72) Inventors: Changho Choi, San Jose, CA (US); Timothy Bisson, San Jose, CA (US); Ke Chen, San Jose, CA (US)

(73) Assignee: SAMSUNG ELECTRONICS CO., LTD.

( * ) Notice: Subject to any disclaimer, the term of this patent is extended or adjusted under 35 U.S.C. 154(b) by 34 days.

(21) Appl. No.: 16/746,803

(22) Filed: Jan. 17, 2020

(65) Prior Publication Data

US 2021/0181963 A1   Jun. 17, 2021

Related U.S. Application Data

(60) Provisional application No. 62/948,192, filed on Dec. 13, 2019.

(51) Int. Cl.
*G06F 3/06*     (2006.01)
*G06F 15/173*   (2006.01)

(52) U.S. Cl.
CPC .......... *G06F 3/0644* (2013.01); *G06F 3/0604* (2013.01); *G06F 3/067* (2013.01); *G06F 3/0659* (2013.01); *G06F 15/17331* (2013.01)

(58) Field of Classification Search
CPC .... G06F 3/0644; G06F 3/0604; G06F 3/0659; G06F 3/067
See application file for complete search history.

(56) References Cited

U.S. PATENT DOCUMENTS

| | | | | |
|---|---|---|---|---|
| 10,615,984 | B1* | 4/2020 | Wang | H04L 63/06 |
| 10,740,005 | B1* | 8/2020 | Ives | G06F 3/067 |
| 2013/0198250 | A1* | 8/2013 | Iwamatsu | G06F 3/0635 |
| | | | | 707/827 |
| 2014/0325115 | A1* | 10/2014 | Ramsundar | G06F 12/0238 |
| | | | | 711/102 |
| 2016/0041918 | A1* | 2/2016 | Jeong | G06F 16/1847 |
| | | | | 711/103 |
| 2016/0099810 | A1* | 4/2016 | Li | G11C 15/00 |
| | | | | 713/193 |
| 2016/0306810 | A1* | 10/2016 | Ni | G06F 16/2471 |
| 2017/0193002 | A1* | 7/2017 | Shvachko | G06F 16/178 |
| 2017/0277477 | A1* | 9/2017 | Xi | G06F 16/2282 |
| 2017/0277715 | A1  | 9/2017 | Strauss et al. | |
| 2018/0121517 | A1  | 5/2018 | Barsness et al. | |
| 2018/0253386 | A1* | 9/2018 | Qiu | G06F 3/0655 |
| 2018/0357234 | A1* | 12/2018 | De | G06F 16/24569 |

(Continued)

*Primary Examiner* — Ryan Bertram
(74) *Attorney, Agent, or Firm* — Renaissance IP Law Group LLP

(57) ABSTRACT

Inventive aspects include a method, apparatus, and system for supporting a native key-value distributed storage system. The system includes a namenode having a KV-SSD and one or more datanodes each including one or more KV-SSDs. The system includes a client device that is communicatively coupled to the namenode and the one or more datanodes. The client device includes a native key-value storage and networking stack. Some embodiments include a hybrid block-based native key-value distributed storage system that supports both block-based files and native key-value tuples.

17 Claims, 9 Drawing Sheets

(56) References Cited

U.S. PATENT DOCUMENTS

| | | | |
|---|---|---|---|
| 2019/0146682 A1* | 5/2019 | Subramanian | G06F 15/17331 |
| | | | 711/103 |
| 2019/0205053 A1* | 7/2019 | Nomura | G06F 3/0689 |
| 2019/0208013 A1 | 7/2019 | Lai | |
| 2019/0243906 A1* | 8/2019 | Bisson | G06F 3/067 |
| 2020/0104047 A1* | 4/2020 | Subbarao | G06F 3/064 |
| 2020/0334292 A1* | 10/2020 | Ganeshan | G06F 3/0667 |

* cited by examiner

NATIVE KEY-VALUE STORAGE ENABLED DISTRIBUTED STORAGE SYSTEM

RELATED APPLICATION DATA

This application claims the benefit of U.S. Provisional Application Ser. No. 62/948,192, filed on Dec. 13, 2019, which is hereby incorporated by reference.

TECHNICAL AREA

The present embodiments relate to storage systems, and more particularly, to systems and methods for providing key-value support throughout an entire architecture of a distributed storage system using key-value storage devices, such as key-value solid state drives (KV-SSDs).

BACKGROUND

In some distributed storage systems that present a key-value interface to clients, the keys and values may need to be mapped onto a block interface, as the block interface is what may be exposed by some SSDs. The management of these individual blocks can be performed at multiple layers in the storage system stack. With some Distributed File Systems (DFS), for example, data nodes may perform block management. One limitation of this approach may be that the client's key-value tuple may require an additional layer of software to map the key-value data structures onto a block interface, as exposed by block storage devices, such as SSDs.

Furthermore, in some master/slave distributed storage systems, the master node (i.e., namenode) may manage file system metadata. Directories may store the named entries inside whether they are files or directories. Files, however, may store user content. In order to store user content, files include an ordered set of blocks, with each block being a fixed size and residing on a storage node in the distributed storage system. Using key-value tuples on a block-based system requires the additional layer of software to map the key-value data structures onto a block interface, thereby negatively impacting performance and efficiency.

BRIEF SUMMARY

Inventive aspects include a method, apparatus, and system for supporting a native key-value distributed storage system. The system may include a namenode having a KV-SSD and one or more datanodes each including one or more KV-SSDs. The system may include a client device that is communicatively coupled to the namenode and the one or more datanodes. The client device may include a native key-value storage and networking stack.

Some embodiments include a hybrid block-based native key-value distributed storage system that supports both block-based files and native key-value tuples. The hybrid system may include a namenode including a KV-SSD, one or more first datanodes each including one or more KV-SSDs, and one or more second datanodes each including one or more block-based SSDs. The client device may be communicatively coupled to the namenode, the one or more first datanodes, and the one or more second datanodes. The client device may include a hybrid block-based native key-value storage and networking stack.

BRIEF DESCRIPTION OF THE DRAWINGS

The foregoing and additional features and advantages of the present inventive principles will become more readily apparent from the following detailed description, made with reference to the accompanying figures, in which.

DETAILED DESCRIPTION

Figure 1:
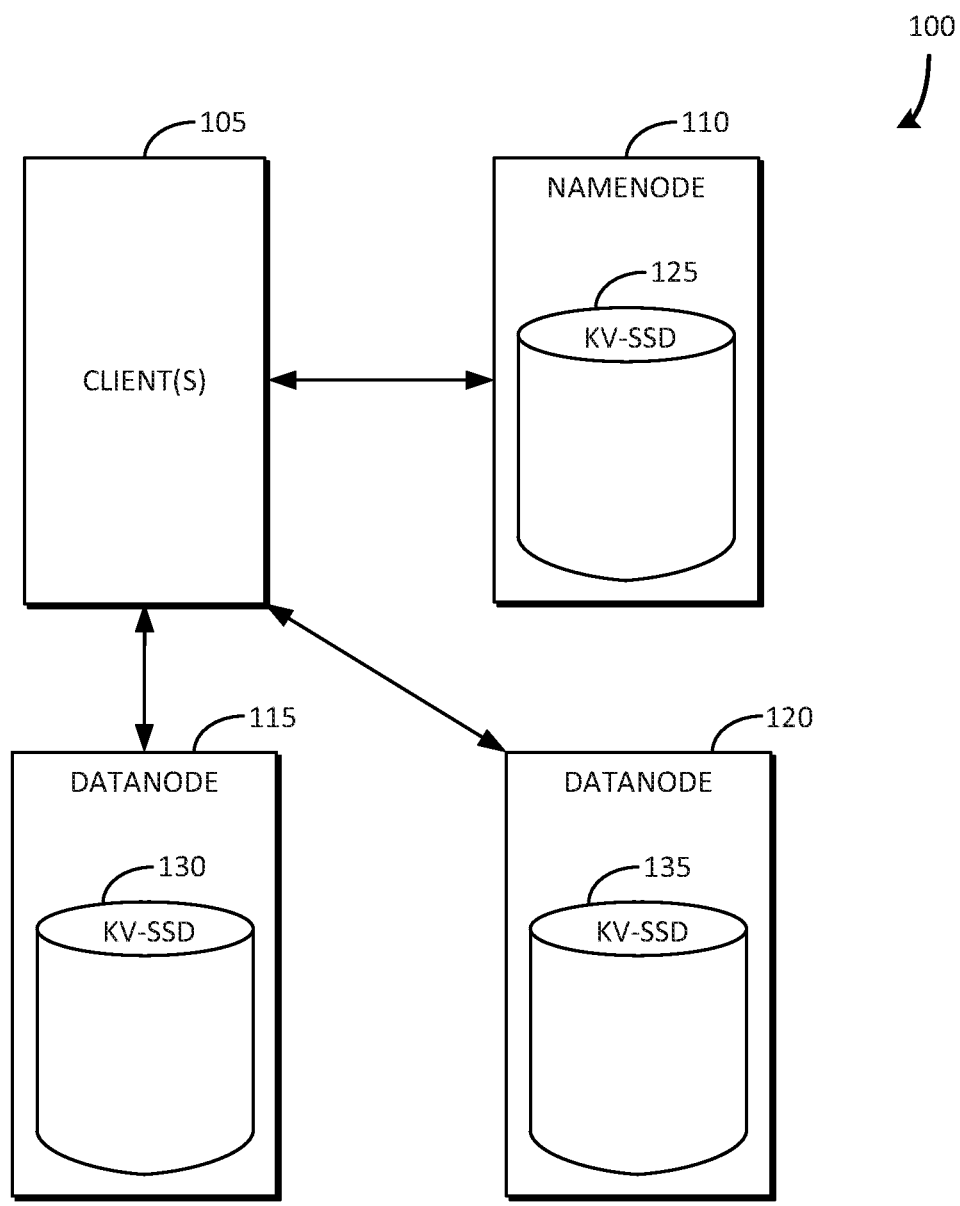
FIG. 1 is an example diagram of a native key-value distributed storage system in accordance with some embodiments.

Reference will now be made in detail to embodiments disclosed herein, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first interface could be termed a second interface, and, similarly, a second interface could be termed a first interface, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Embodiments disclosed herein include a distributed storage system in which the underlying storage devices are KV-SSDs. In addition, a key-value data structure can be exposed to a client of the distributed storage system. Thus, a key-value interface can be preserved from the client down to the individual KV-SSDs, thereby reducing or eliminating the need for key-value-to-block mapping. Some embodiments include a technique for managing client key-value tuples. For example, a key-value tuple can reside on one KV-SSD in a storage node, or alternatively, the key-value tuple can be striped across multiple KV-SSDs on one or more storage nodes to exploit node-level parallelism.

Some distributed storage systems may only use a block-based protocol, and write directly to remote storage devices by specifying the block address on the remote target SSD. In contrast, in order to provide native support of key-value interfaces and leverage KV-SSDs, the networking protocol as disclosed herein supports key-value interfaces and/or functions, such as put( ), get( ), and delete( ). In addition, as disclosed herein, some embodiments include a hybrid storage management technique for managing metadata when the storage includes both normal block-based files and key-value tuples. This hybrid approach can be achieved by modifying a metadata node, which may store its information on block storage, to also include support for key-value tuples. For a storage system that stores key-value tuples (i.e., non-hybrid systems), there may be no need for a block-based metadata node. Instead, a key-value-only metadata node can be used, in which client metadata is also stored on a KV-SSD. In such a system, there may not be any block-based storage.

FIG. 1 is an example diagram of a native key-value distributed storage system 100 in accordance with some embodiments. The system 100 may include, for example, one or more clients 105, a namenode 110, a first datanode 115 and a second datanode 120. The namenode 110 may stored key location information, and the datanodes may store key-value tuples on one or more KV-SSDs, as further described below. It will be understood that any suitable number of datanodes may be included. The client 105 may be a computing device such as a computer server, a personal computer, a laptop computer, a tablet computer, or the like. The namenode 110 may be stored on one or more KV-SSDs 125. The datanode 115 may provide access to one or more KV-SSDs 130. The datanode 120 may provide access to one or more KV-SSDs 135. In some embodiments, the namenode 110 may be stored on one of the datanodes 115 or 120, thereby eliminating the need for the KV-SSD 125. The native key-value distributed storage system 100 may provide native key-value support throughout, from the one or more clients 105 down to the individual KV-SSDs (e.g., 130 and/or 135). As used herein, the term "native" means that one or more interfaces are provided for creating, accessing, and/or deleting one or more key-value tuples, and that the one or more interfaces provide this functionality throughout the system 100, from the one or more clients 105 down to the individual KV-SSDs (e.g., 130 and/or 135).

Figure 2A:
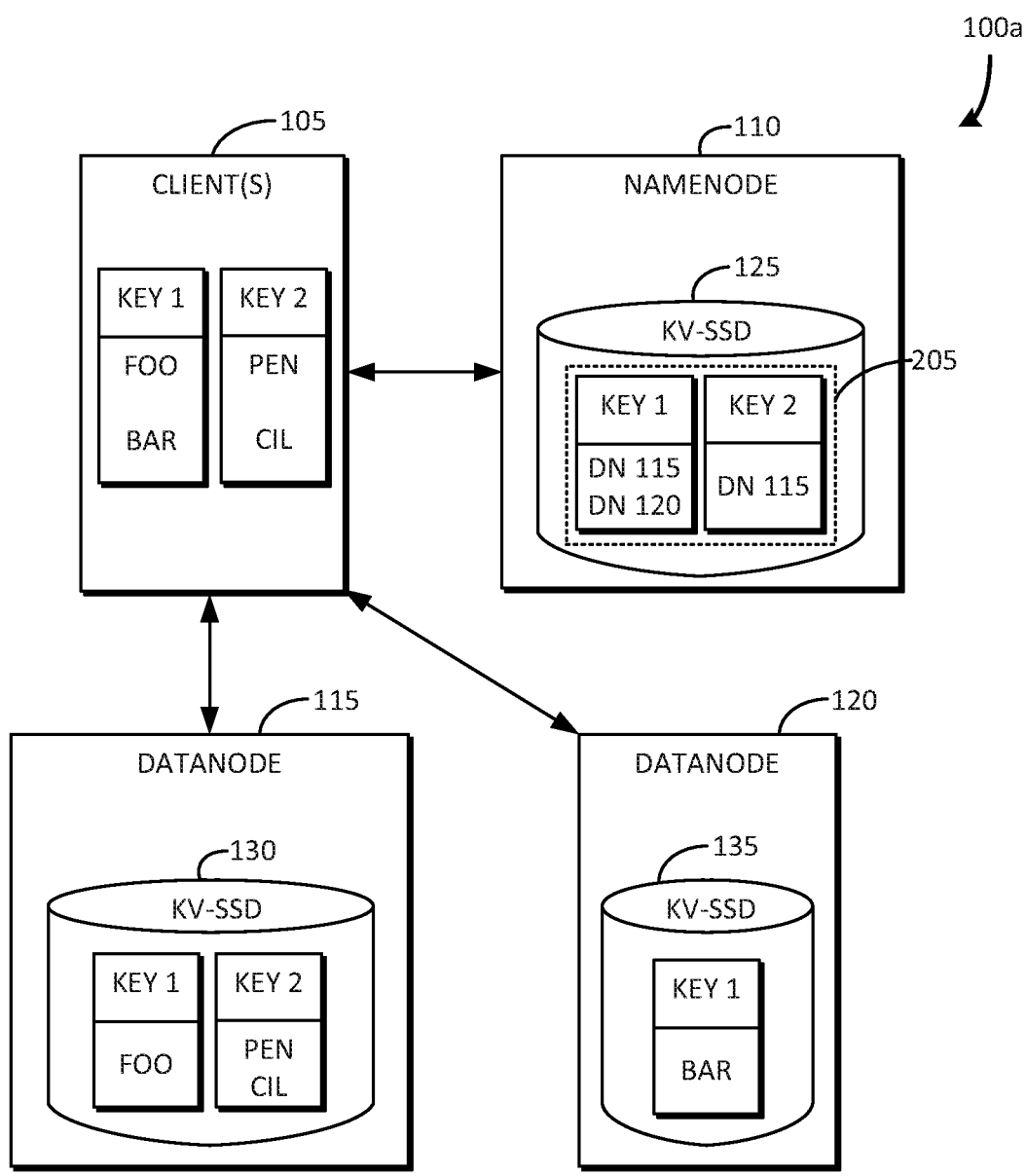
FIG. 2A is an example diagram of the native key-value distributed storage system of FIG. 1 showing example details in accordance with some embodiments.

FIG. 2A is an example diagram of the native key-value distributed storage system 100a of FIG. 1 showing additional details in accordance with some embodiments. With the system 100a, there may not be a need for the disclosed systems to map a key-value tuple to blocks as may otherwise be required by some block-based storage systems. This reduced need for mapping may enable software layers to be simpler, the disclosed system to have less overhead, and enables more scalability. As shown in FIG. 2A, the namenode 110 may store key location information 205. The key location information 205 may be stored as an ordered list of datanodes. For example, KEY 1 may be associated with the datanode 115 and the datanode 120. By way of another example, KEY 2 may be associated with only the datanode 115. The corresponding keys may be stored on the datanodes using the same key identifier. For example, as shown in the datanode 115, both KEY 1 and KEY 2 may be stored along with their corresponding values. As shown in the datanode 120, only KEY 1 is stored along with its corresponding value.

In some respects, the KV-SSDs may be used as a storage device unit. As such, a client's key-value tuple (e.g., KEY 1: FOO, BAR) may be broken up into multiple internal key-value tuples, as shown in FIG. 2A. As can be seen, the key-value tuple KEY 1: FOO, BAR can be broken up and striped across the datanode 115 and the datanode 120. Put differently, KEY1:FOO may be stored on KV-SSD 130 and KEY1:BAR may be stored on KV-SSD 135. One difference between breaking up a client key-value tuple into multiple internal key-value tuples and breaking up a key-value tuple into multiple fixed-size blocks may be that, with the internal key-value tuples, their size can be dynamic (e.g., 1, 2, N, etc.). In contrast, with a conventional block-based key-value tuple, the number of blocks that are needed to store the tuple may be fixed (i.e., based on the key-value size), thereby causing fragmentation internal to the blocks.

In the example shown in FIG. 2A, KEY 2 has a value including six letters (i.e., PEN CIL) and is completely stored as a single key-value tuple on the datanode 115, whereas KEY 1 has a value including six letters (i.e., FOO BAR), but is broken up into two halves, each half having three letters and stored across the datanode 115 and the datanode 120. Accordingly, the disclosed systems may not need to further split up the value of KEY 1 into blocks because the KV-SSDs can support flexible value size. Also, the two segments of KEY 1's value may be stored according to how the datanodes are ordered (i.e., datanode 115, datanode 120) for the particular KEY 1 in the namenode 110.

A single key-value tuple may be broken up into multiple internal key-value pairs, facilitating the parallelization of I/O operations across the storage nodes in the distributed system. If there are multiple different I/O operations for different client key-value tuples, then parallelism can be achieved across the storage nodes across the key-value tuples as the aggregated throughput of the entire system. The disclosed systems can implement scaling of operations by storing multiple key-value tuples in parallel. By increasing the number of datanodes for a client's key-value internal tuples, parallelism is increased for a single key-value tuple. Intra-key-value tuple provides parallelism with latency improvements especially for large values is also achieved.

Figure 2B:
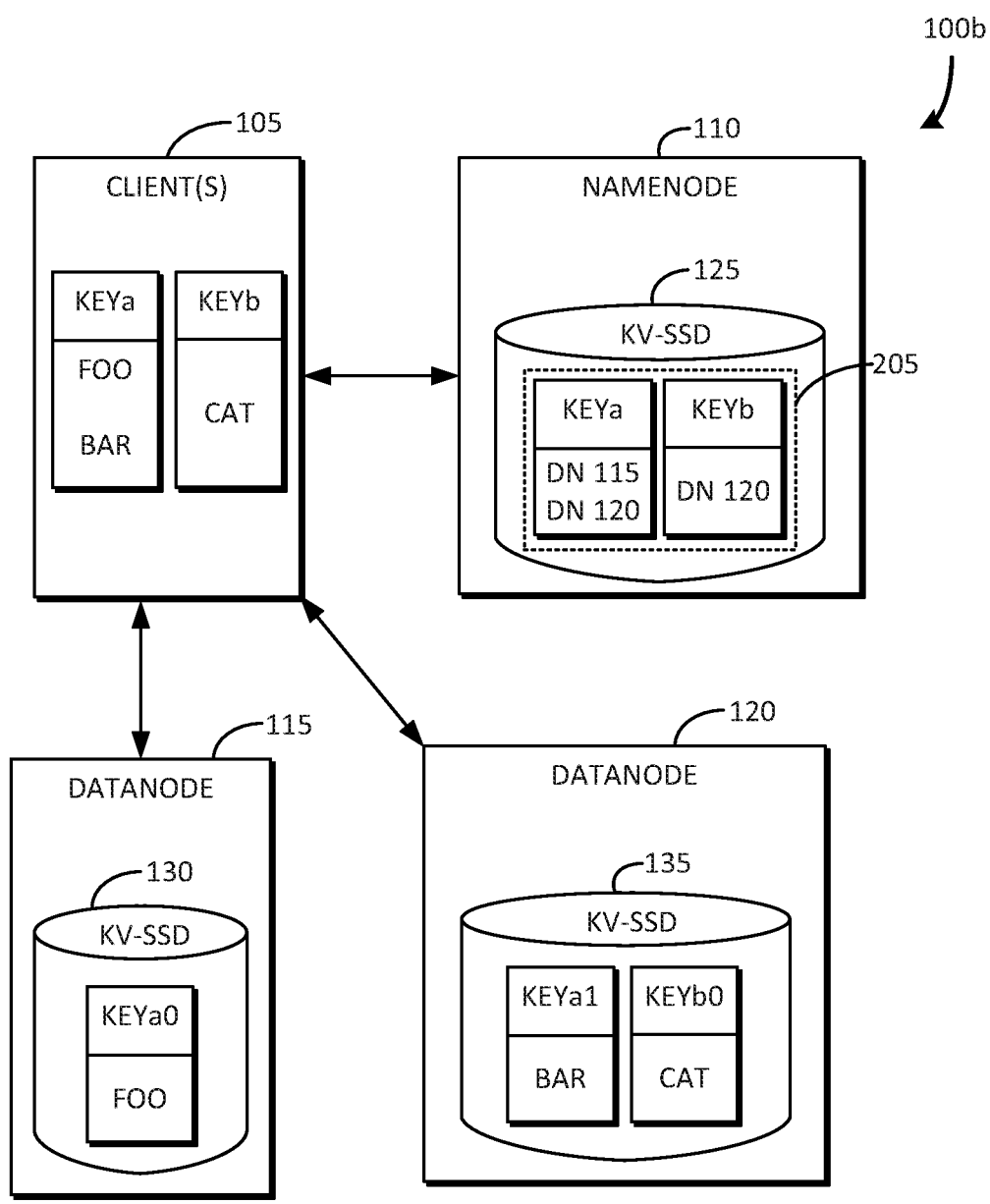
FIG. 2B is an example diagram of the native key-value distributed storage system of FIG. 1 showing different example details in accordance with some embodiments.

FIG. 2B is an example diagram of the native key-value distributed storage system 100b of FIG. 1 showing different example details in accordance with some embodiments. With the system 100b, there may not be a need for the disclosed systems to map a key-value tuple to blocks as may otherwise be required by some block-based storage systems. This reduced need for mapping may enable software layers to be simpler, the disclosed system to have less overhead, and enables more scalability. As shown in FIG. 2B, the namenode 110 may store key location information 205. The key location information 205 may be stored as an ordered list of datanodes (e.g., 115, 120, and so forth). For example, KEYa may be associated with the datanode 115 and the datanode 120. By way of another example, KEYb may be associated with only the datanode 120. The corresponding keys may be stored on the datanodes using the same key identifier. For example, as shown in the datanode 115, KEYa0 may be stored along with its corresponding value FOO. By way of another example, as shown in the datanode 120, both KEYa1 and KEYb0 may be stored along with their corresponding values BAR and CAT, respectively.

In some respects, the KV-SSDs may be used as a storage device unit. As such, a client's key-value tuple (e.g., KEYa: FOO, BAR) may be broken up into multiple internal key-value tuples, as shown in FIG. 2B. As can be seen, the key-value tuple KEYa: FOO, BAR can be broken up and striped across the datanode 115 and the datanode 120. Put differently, KEYa0:FOO may be stored on KV-SSD 130 and KEYa1:BAR may be stored on KV-SSD 135. One difference between breaking up a client key-value tuple into multiple internal key-value tuples and breaking up a key-value tuple into multiple fixed-size blocks may be that, with the internal key-value tuples, their size can be dynamic (e.g., 1, 2, N, etc.). In contrast, with a conventional block-based key-value tuple, the number of blocks that are needed to store the tuple may be fixed (i.e., based on the key-value size), thereby causing fragmentation internal to the blocks.

In the example shown in FIG. 2B, KEYb has a value including three letters (i.e., CAT) and is completely stored as a single key-value tuple on the datanode 120, whereas KEYa has a value including six letters (i.e., FOO BAR), but is broken up into two halves, each half having three letters and stored across the datanode 115 and the datanode 120. Accordingly, the disclosed systems may not need to further split up the value of KEYa into blocks because the KV-SSDs can support flexible value size. Also, the two segments of KEYa's value may be stored according to how the datanodes are ordered (i.e., datanode 115, datanode 120) for the particular KEYa in the namenode 110.

In the example embodiment shown in FIG. 2B, KEYa0, KEYa1, KEYb0, and so forth, may be internal keys, and the namenode 110 may recover metadata based on a key index number (i.e., 0, 1, 2, and so forth). When mapping a client's key-value tuple to individual key-value tuples on the KV-SSD, the same key may be used for each internal key-value pair on the KV-SSD in a storage node (i.e., each datanode can be storing a portion of the client's key-value tuple). The offset of a datanode in a key-value information data structure (e.g., KVInfo) may determine the order of that partial value in the client's aggregated key-value tuple. However, to enable data verification, a key index number (e.g., 0, 1, 2, N, and so forth) may be appended to the key stored in the KV-SSD on the storage node to help identify its location in the aggregate key. For data verification, since there will be multiple key-value tuples in the distributed storage system, this is a way to identify which portion of the client key-value tuple the key index number represents. Additionally, the key index number helps in the case when the system puts two or more internal key-value tuples on the same datanode. For added resilience, the client 105 may use the additional key index number information if the namenode 110 goes down and loses its key-value information data structure (e.g., KVInfo) stored in its KV-SSD. All of the keys from the key-value storage system 100*b* may be extracted using the key index numbers to determine which portion of the client key-value tuple the corresponding key index number represents. Accordingly, based on the key index numbers, the disclosed systems (e.g., 100*b*) can reconstruct the metadata of the files and directories in the distributed system if necessary. Furthermore, cyclic redundancy check (CRC) code may be included to the end of values to ensure that the value is intact and correct.

Figure 3:
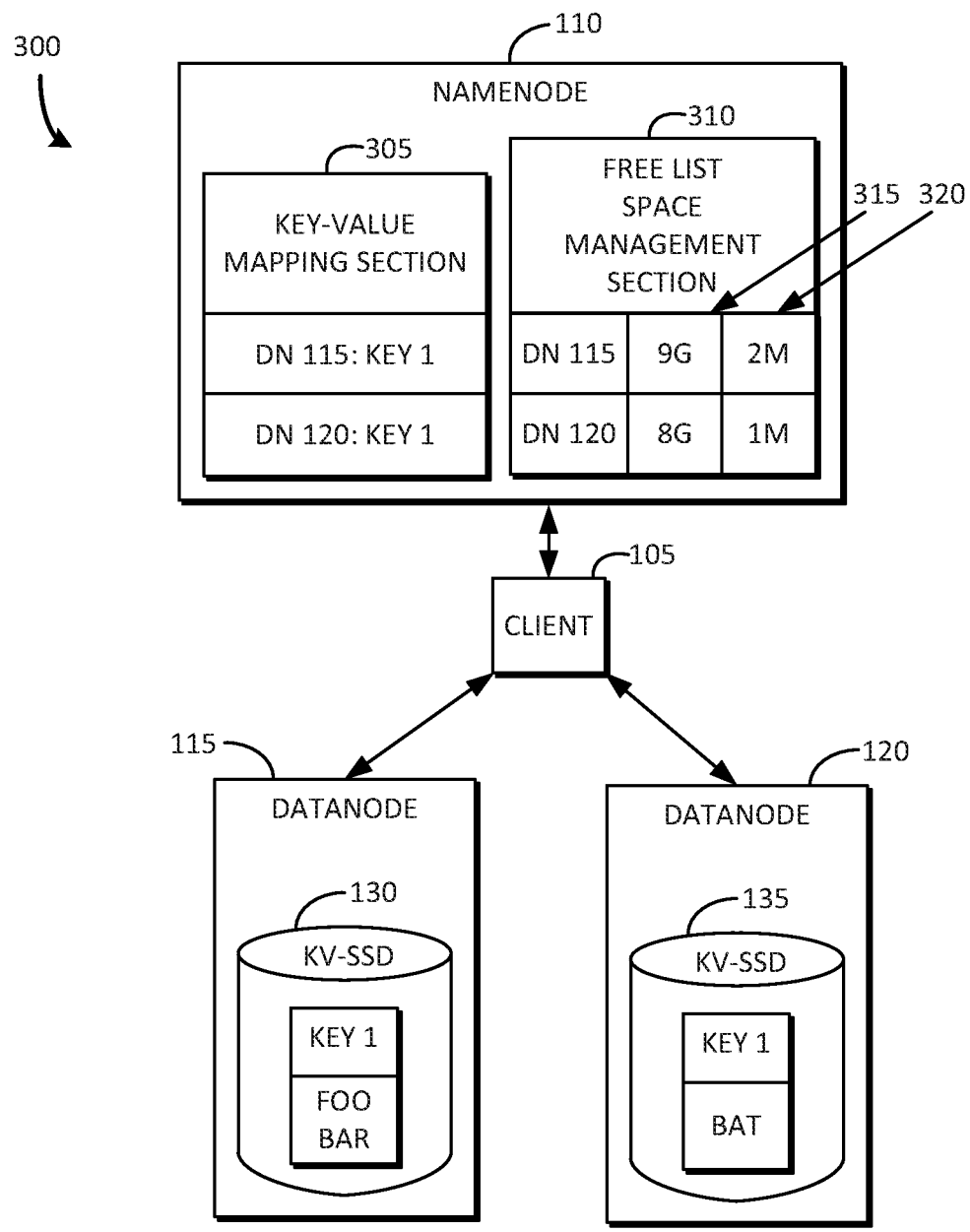
FIG. 3 is yet another example diagram of a native key-value distributed storage system including a namenode having a key-value mapping section and a free list space management section in accordance with some embodiments.

FIG. 3 is yet another example diagram of a native key-value distributed storage system 300 in accordance with some embodiments. In this example embodiment, the client 105 may cause to be stored or accessed a key named "KEY 1" containing the value "FOO," "BAR," and "BAT." A subsection of the value (i.e., "FOO," "BAR") may be stored on the datanode 115, and another subsection (i.e., "BAT") may be stored on the datanode 120. The namenode 110 may include a key-value mapping section 305, which maps client key-value tuples to key-value tuples stored on the KV-SSDs (e.g., 130 and/or 135). The namenode 110 may also include a free list space management section 310, which may store and/or track the total capacity (e.g., 315) of each datanode, and the used space (e.g., 320) of each datanode.

Figure 4:
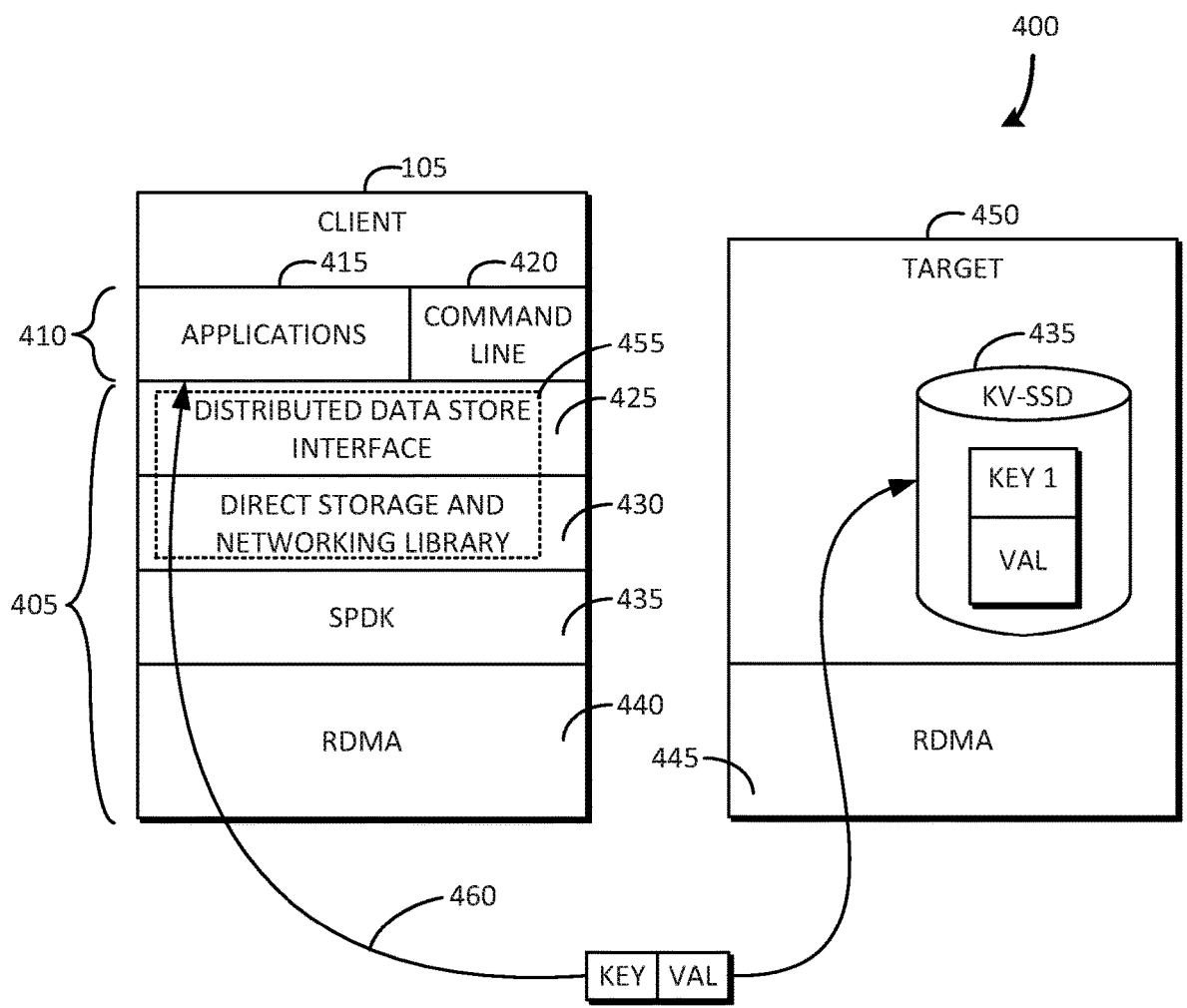
FIG. 4 is still another example diagram of a native key-value distributed storage system including a client device and a target device in accordance with some embodiments.

FIG. 4 is still another example diagram of a native key-value distributed storage system 400 in accordance with some embodiments. The key-value distributed storage system 400 may use a network transfer protocol such as non-volatile memory express (NVMe), non-volatile memory express over fabrics (NVMe-oF), and/or the like. It will be understood that other suitable network transfer protocols can be used, such as Infiniband®, TCP/IP, Fibre Channel, or the like. The client 105 may include a storage and networking stack 405 and an application layer 410. The application layer 410 may include one or more applications 415, command line interface 420, or the like. The one or more applications 415, command line interface 420, or the like, may directly call certain functions such as put( ), get( ), delete( ), and/or the like using native key-values as parameters, as further described below. When a user types '1s', for example, using the command line interface 420, the content of a directory is listed, which may include the key-value tuples themselves that are stored on the KV-SSDs. In a hybrid example embodiment, the content of the directory can include both block-based files and the key-value tuples themselves.

The storage and networking stack 405 may include a distributed data store interface 425, a direct storage and networking library 430, a storage performance development kit (SPDK) 435, and a remote direct memory access (RDMA) engine 440. The application layer 410 may interact with the key-value tuples stored on the KV-SSD 435 of a target node 450 via the storage and networking stack 405. In some embodiments, the distributed data store interface 425 and the direct storage and networking library 430 run on a virtual machine, such as a Java virtual machine (JVM) 455. The direct storage and networking library 430 may include an interface from the JVM 455 to native code of the SPDK 435. A zero-data-copy data transfer may be facilitated by a user-level library of the SPDK 435, which may connect the client 105 and the target node 450 together with a direct RDMA data transfer 460 using an RDMA engine 445 of the target node 450 and the RDMA engine 440 of the client 100. With such a reduced software stack, pointers of data buffers in the JVM 455 may be passed directly to the target node 450, resulting in zero data copy along a traditional RDMA 10 data path. In other words, the data transfers may happen directly between the client 105 and the target 450 using RDMA data transfers, without copying the data associated with the key-value tuple through the native key-value storage and networking stack 405.

Accordingly, one or more pointers to the respective data segments making up the client's key-value tuple may be sent directly to the KV-SSDs (e.g., 435) on storage nodes (e.g., 450), for example, using a remote transfer protocol. In some embodiments, there may not be a data copy requirement from the JVM application to the hardware over the network-based protocol (e.g., NVMe-oF, Infiniband®, TCP/IP, Fibre Channel, and/or the like), which transfers the key-value pairs.

Some embodiments described herein may make use of a type of container: namely, key-value entries, where the client (e.g., 105) creates one or more key-value tuples (e.g., KEY 1: VAL) that use the put( )/get( ) interface, rather than the tradition, open( ), read( ), write( ) close( ) interface, typically associated with block-based files. With a key-value storage type, the container may be different from traditional files in that its internal content is one or more key-value information data structures (e.g., KVInfo), where each KVInfo entry contains a key, and a pointer to the one or more datanodes storing that key. The number of datanodes per KVInfo can be flexible, such that there can be multiple datanodes per key. The pointers to these datanodes may actually be an ordered list of datanodes (e.g., 205 of FIGS. 2A and 2B), representing the partitioning of the actual values comprising the client's original value. In contrast, in a block-based storage system, the number of blocks used to store a file may be fixed.

A datanode (e.g., 450, 115, and/or 120) may store the content of a user key-value tuple. This has the advantage of fewer RPCs than a regular file because at a time of creation, the size of the key-value tuple may be known, and the content of the tuple may be sent to the storage node (i.e., datanode).

In some embodiments, KV-NVMe-oF may be leveraged to provide direct client-side key-value operations in a distributed storage system with zero-copy data transformation in JVM-based systems. For example, the KV-NVMe-oF protocol may be extended to Java by wrapping the actual I/O NVMe-oF commands to issue put( ), get( ), and delete( ) KV-SSD operations. This transformation from the C programming language-based NVMe-oF application programming interfaces (APIs) to Java may not incur data copies because only the pointers between the JVM and the lower-level language need to be copied. By exposing the key-value APIs to the client, the distributed storage system client may be able to directly issue I/O operations to a specific KV-SSD on a storage node residing in a cluster. Even without the use of JVM as a middle interface, the NVMe-oF protocol of the disclosed systems can leverage from client (e.g., 105) to datanode (e.g., 450, 115, and/or 120) as well.

Figure 5:
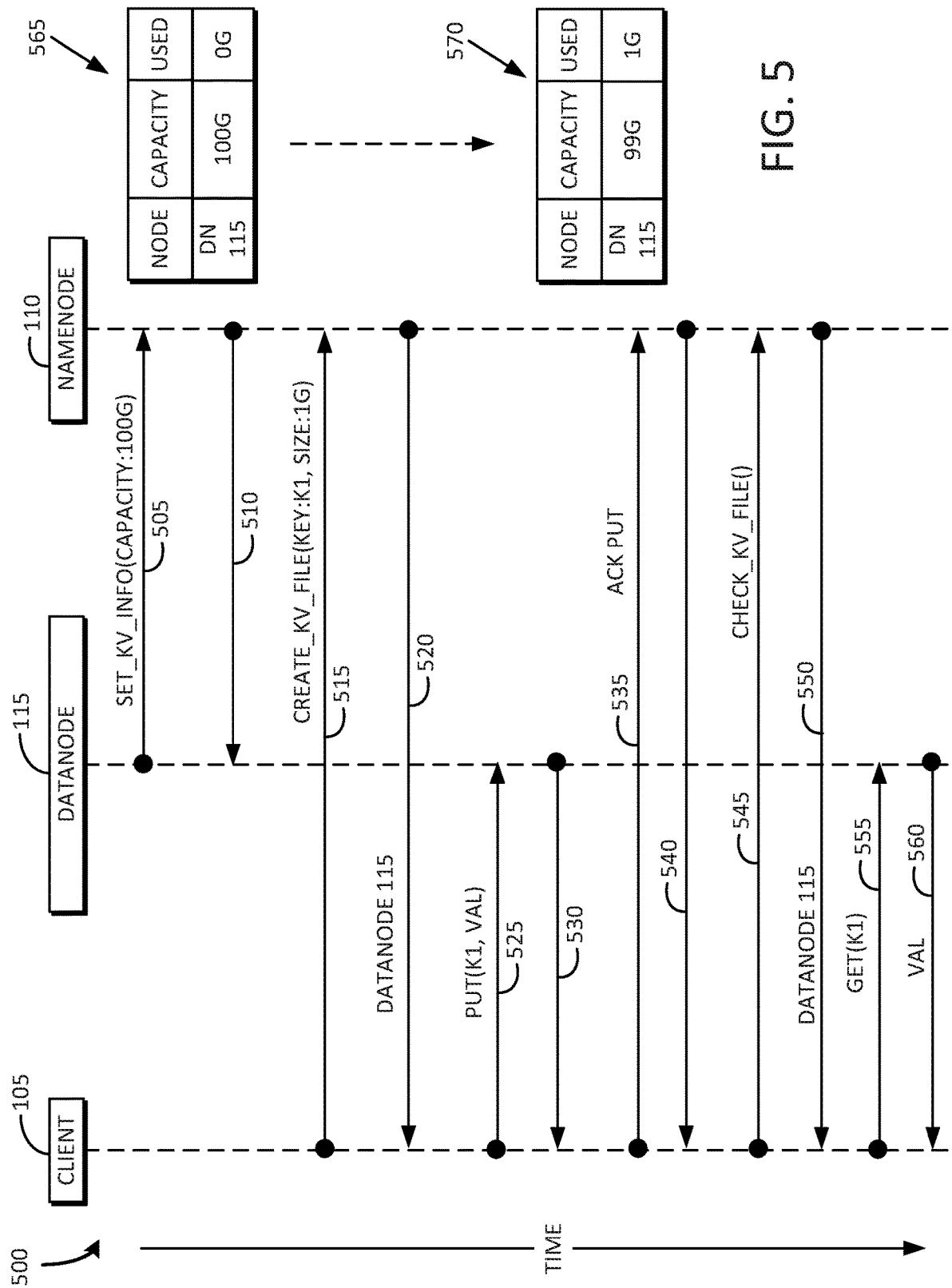
FIG. 5 is an example diagram of a timing flow diagram of the operation of a native key-value distributed storage system in accordance with some embodiments.

FIG. 5 is an example diagram of a timing flow diagram 500 of some example operations of a native key-value distributed storage system in accordance with some embodiments. The initial state of the datanode (e.g., datanode 115) may be 100 gigabytes (GB) of capacity, for example, and 0 GB of the capacity used, as shown at 565. The technique illustrated in the timing flow diagram 500 may begin with 505 during which a datanode (e.g., datanode 115) may register KV-SSD capacity to a namenode (e.g., 110) using a key-value native operation call. For example, an operation call such as SET_KV_INFO(CAPACITY:100 G) may be used to register a capacity of 100 gigabytes to the namenode (e.g., 110). At 510, the namenode can acknowledge the request made at 505. At 515, the client 105 may create a key-value by sending a request via a key-value native distributed storage system (e.g., 100 of FIG. 1). For example, the client 105 may use a key-value native operation call to create a new key with a certain size (e.g., about 1 gigabyte). For example, the client 105 may make an operation call to CREATE_KV_FILE(KEY:K1, SIZE:1 G), which may create a key K1 having a 1 gigabyte size. The namenode 110 may receive the operation call and parameters passed at 515, and may respond with a datanode (e.g., datanode 115) back to the client 105, as shown at 520. At 525, the client 105 may associate a new value with the key by calling a key-value native operation call. For example, the client 105 may make an operation call to PUT(K1, VAL), which may associate a new value VAL with the key K1. The datanode (e.g., datanode 115) may receive the operation call and parameter passed at 525, and may acknowledge the request at 530. At 535, the client may send an acknowledge put message 535 to the namenode 110. At 540, the namenode 110 may decrement the available capacity by the corresponding value size as shown at 570, after the put by the client 105 is completed.

The client 105 may continue with a get operation in order to access a value associated with a key. For example, at 545, the client 105 may use a key-value native operation, which may interface with the namenode 110. For example, the client 105 may make an operation call to CHECK_KV_FILE( ), which may check a key-value file. The namenode 110 may return a datanode (e.g., datanode 115) to the client 105, as shown at 550. At 555, the client 105 may then use a key-value native operation to get the value from the datanode (e.g., datanode 115). For example, the client 105 may make an operation call to GET(K1), which may get key K1. At 560, the datanode (e.g., datanode 115) may return the value associated with the key K1.

By using KV-SSDs (e.g., 130 and/or 135), block management may be reduced, because the system design may reduce or eliminate the concept of blocks from the bottom up and throughout the system. One example requirement for the namenode (e.g., 110) may be tracking capacity of the individual KV-SSDs (e.g., 130 and/or 135) on a storage node (e.g., 115 and/or 120). Therefore, when a datanode (e.g., 115 and/or 120) starts up, it may register its capacity to the namenode. as illustrated in FIG. 5. The namenode (e.g., 110) then manages this capacity on a per KV-SSD basis. When the namenode (e.g., 110) receives a request to store a key-value tuple of a certain size, the namenode (e.g., 110) may consult its map of KV-SSDs and the available capacity of the KV-SSDs to make a decision about which datanodes (e.g., 115 and/or 120) should store that client's key-value tuple. The decision can be policy-based, and the disclosed systems can use any number of polices, such as round-robin, for example. After causing a client (e.g., 105) to store a key-value tuple on a particular datanode, the namenode may reduce the available capacity of that datanode by a corresponding size of the value.

Figure 6:
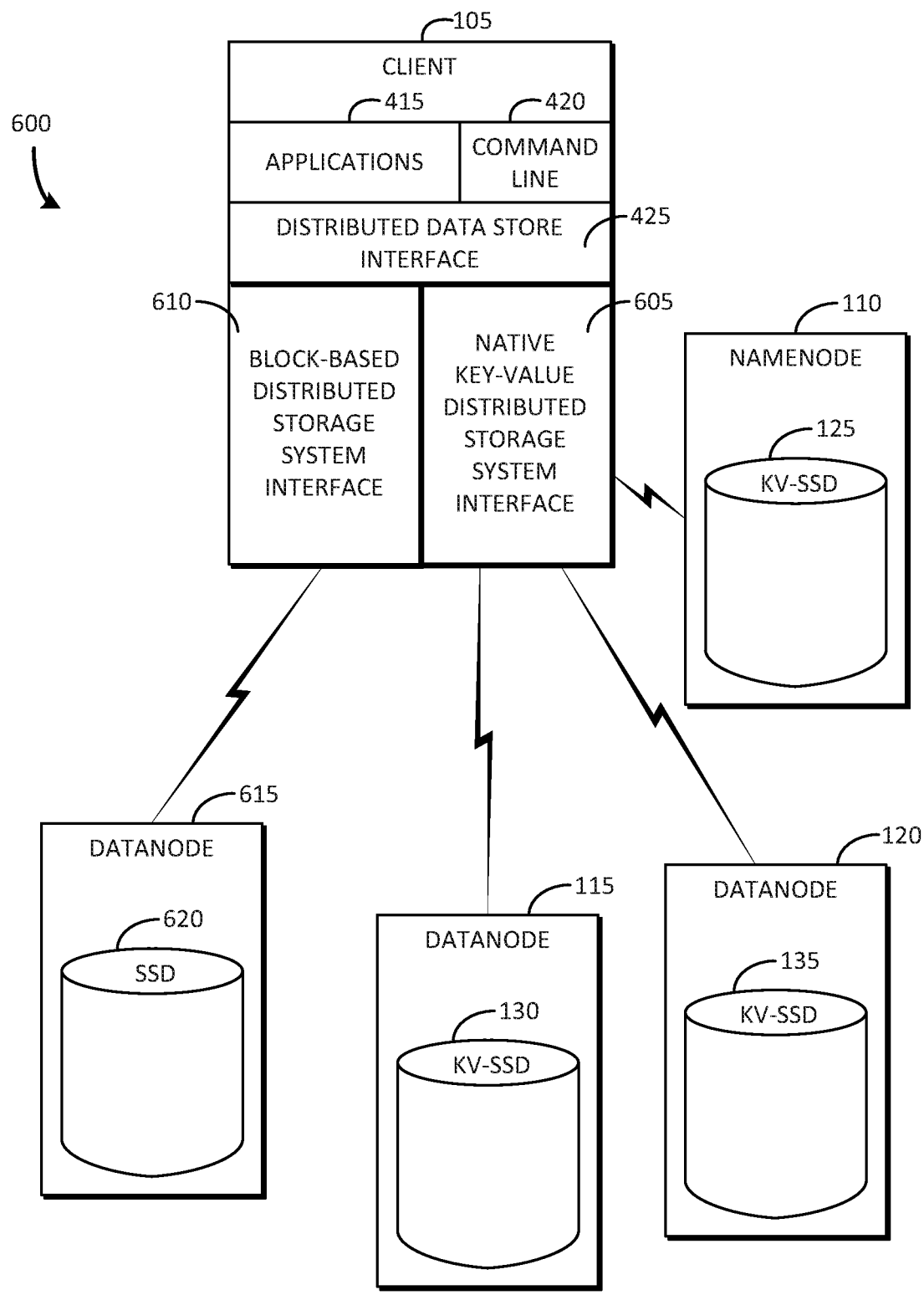
FIG. 6 is an example diagram of a hybrid block-based native key-value distributed storage system in accordance with some embodiments.

FIG. 6 is an example diagram of a hybrid distributed storage system 600 of block-based and native key-value storage in accordance with some embodiments. In this example embodiment, the distributed storage system 600 can natively handle both block-based files and native key-value-based tuples. Put differently, the hybrid distributed storage system 600 may support both block-based and native KV-SSDs simultaneously. For example, the client 105 can include the one or more applications 415 and the command line interface 420, either or both of which may interface with the distributed data store interface 425. When a native key-value operation or command is used to create, access, or delete a key-value tuple, then the execution path flows through the native key-value distributed storage system interface 605, and to the namenode 110 and the various datanodes (e.g., datanode 115 and/or datanode 120). Otherwise, when a block-based operation or command is used to create, access, or delete a block-based file, then the execution path flows through the block-based distributed storage system interface 610, and to the block-based datanode (e.g., datanode 615), which may have a conventional block-based SSD 620. Accordingly, in a hybrid embodiment as shown in system 600, regular files (i.e., backed by fixed blocks) may be combined alongside key-value tuples (i.e., backed by key-value pairs stored on KV-SSDs) in the same file system namespace.

The block-based distributed storage system interface 610 and/or the block-based datanode 615 may include a block-based metadata node. The metadata for a key-value tuple may be the same in the hybrid block-based native key-value distributed storage system 600 as that described above in the non-hybrid systems. One difference in the hybrid system 600 is that the block-based file system metadata may be extended, such that storing of the content of files and directories using a block-based architecture also stores key-value tuples, where the key-value tuple is a different type of entity that is not block-based.

Figure 7:
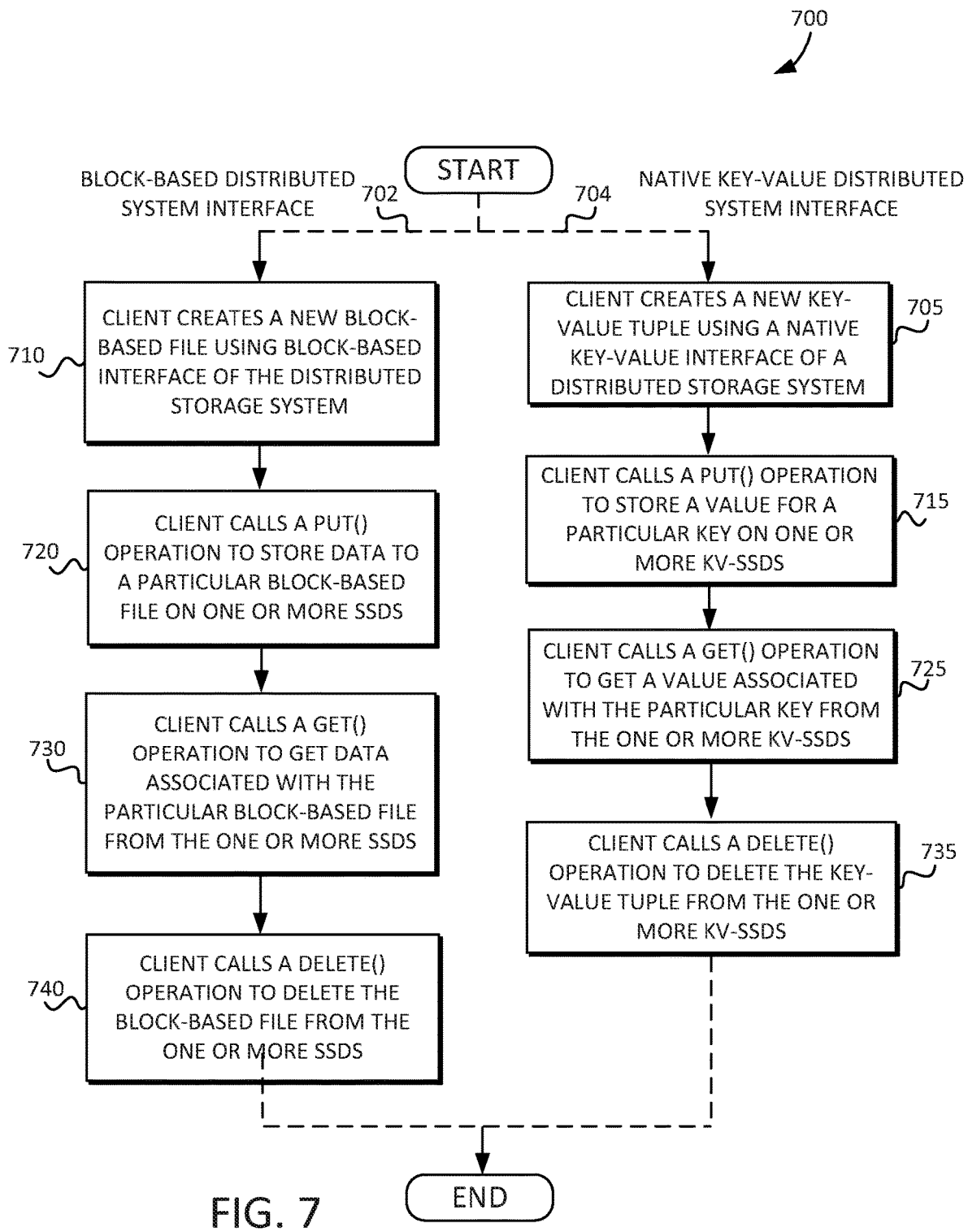
FIG. 7 is a flow diagram illustrating a technique for handling a hybrid combination of native key-value tuple requests and block-based file requests on a distributed storage system in accordance with some embodiments.

FIG. 7 is a flow diagram 700 illustrating a technique for handling a hybrid combination of native key-value tuple requests and block-based file requests on a distributed storage system in accordance with some embodiments. The flow may follow 702 when the client invokes a block-based distributed system interface, and/or may follow 704 when the client invokes a native key-value distributed interface.

At 705, a client may create, or cause to be created, a new key-value tuple using a native key-value interface of a distributed storage system. At 715, the client may call a put( ) operation to store a value for a particular key on one or more KV-SSDs. At 725, the client may call a get( ) operation to get a value associated with the particular key from the one or more KV-SSDs. At 735, the client may call a delete( ) operation to delete the key-value tuple from the one or more KV-SSDs.

At 710, the client may create, or cause to be created, a new block-based file using a block-based interface of the distributed storage system. At 720, the client may call a put( ) operation to store data to a particular block-based file on one or more SSDs. At 730, the client may call a get( ) operation to get data associated with the particular block-based file from the one or more SSDs. At 740, the client may call a delete( ) operation to delete the block-based file from the one or more SSDs. It will be understood that the steps in FIG. 7 need not be performed in the order shown. For example, the steps may be performed in a different order and/or may have intervening steps that are not shown.

Figure 8:
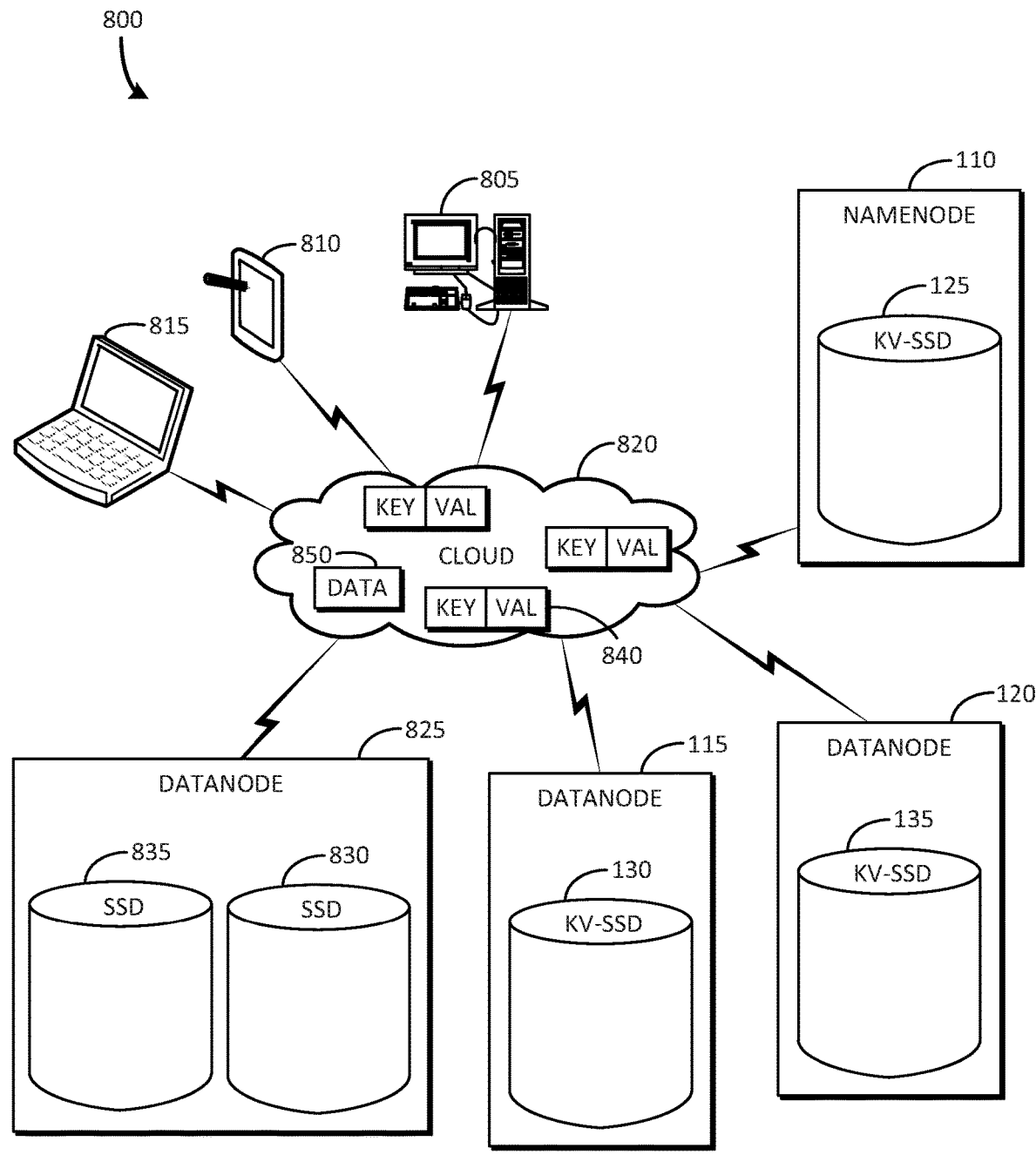
FIG. 8 is an example block diagram of a computing system including a hybrid key-value distributed storage system in accordance with some embodiments.

FIG. 8 is an example block diagram of a hybrid key-value distributed storage computing system 800 including one or more clients (e.g., 805, 810, and/or 815), a namenode 110, one or more native key-value datanodes (e.g., 115 and/or 120), and one or more block-based datanodes (e.g., 825) according to some embodiments as disclosed herein. The one or more clients (e.g., 805, 810, and/or 815) may be communicatively coupled to the namenode 110, the native key-value datanodes (e.g., 115 and/or 120), and the block-based datanode 825 via a cloud 820. The hybrid key-value distributed storage computing system 800 may transmit, receive, and store both key-value tuples (e.g., 840) and block-based data (e.g., 850). The distributed storage computing system 800 may support native key-value operations throughout the software stack on the one or more clients (e.g., 805, 810, and/or 815), and may store the key-value tuples (e.g., 840) on native KV-SSDs (e.g., 130 and/or 135).

Reference is now made to FIGS. 1 through 8.

Embodiments of the disclosed systems and methods herein modify input/output (I/O) path operations in a distributed storage system to go directly to a KV-SSD, thereby bypassing the local file system that typically resides on a local storage node. The disclosed systems enable the native integration of KV-SSDs into an existing architecture of a master/slave distributed file system. The various embodiments described herein include native support of a key-value client interface throughout an entire architecture of the distributed storage system by leveraging native KV-SSDs, thereby avoiding inefficiencies of having to map key-value interfaces onto underlying block storage in a distributed system.

Some embodiments disclosed herein may use a data structure (e.g., 205 of FIGS. 2A and 2B) that is an ordered list of one or more internal key-value tuples, stored on one or more storage nodes (e.g., 115 and/or 120), where each internal key-value tuple is stored natively in a KV-SSD (e.g., 130 and/or 135). This can enable flexibility in scaling performance and minimizing overhead. For example, a single client key-value tuple (e.g., KEY 1 of FIG. 2A and/or KEYa of FIG. 2B) may be striped across multiple KV-SSDs (e.g., 130 and/or 135), and the amount of data stored per KV-SSD may be determined by a striping factor, not by an arbitrary value such as block size.

When the distributed storage system (e.g., 100, 100a, 100b, 300, and/or 400) only stores key-value tuples, i.e., no block-based files, there may be a reduced need or no need to use the traditional block-based file system metadata system to manage files and associated directories. Instead, embodiments disclosed herein provide systems and methods to manage the location of client key-value tuples using a key-value metadata system (e.g., 100, 100a, 100b, 300, and/or 400), which may also be stored in native KV-SSDs (e.g., 115 and/or 120) on the namenode (e.g., 110). Given a particular client key (e.g., KEY 1), this key-value metadata system can be used to locate the storage node or nodes (e.g., 130 and/or 135), which store the actual value for the client's particular key (e.g., KEY 1).

Accordingly, key-value tuples may be remotely transferred from a client (e.g., 105) to a storage node (e.g., 130 and/or 135) using KV-SSDs (e.g., 130 and/or 135) using zero-copy data transfer through a JVM-based distributed system. Conventional data IO approaches using the NVMe-oF protocol only support transferring data in blocks with a fixed size and a pre-determined address in the target device (e.g., SSD). To transfer key-value pairs remotely, the NVMe-oF protocol (or similar protocol) is extended as disclosed herein to incorporate arbitrary sized keys and values in addition to a fixed block address and length. The client key-value tuple (e.g., KEY 1: FOO, BAR) may be created by a JVM application, with the metadata created on the namenode (e.g., 305 and/or 310), with one or more specific datanodes (e.g., 115 and/or 120) storing all or portions of the client's key-value tuple (e.g., KEY 1: FOO, BAR). Using KV-SSDs (e.g., 130 and/or 135), it may not be necessary to maintain the mapping of key-value tuples to blocks. Rather, a client key-value tuple can be directly stored on a storage node's KV-SSD without any additional metadata.

One advantage of the embodiments disclosed herein is that key-value tuples from a client down to the storage device are natively integrated, thereby reducing the number of indirect mapping layers. Overhead of individual block management on namenodes is minimized. By using KV-SSDs, the namenode need not be stored in the individual block information. The namenode is only responsible for storing the location (i.e., datanode) of where each tuple is located, which can require less metadata to maintain a large distributed file system. Additionally, the datanode need may not need to have a local file system because the KV-SSD handles persistently storing the key-value tuples for the datanode. In addition, block size may be eliminated, which may be an artifact of having blocks and the overhead of the namenode having to manage each block in the distributed storage system. With the native key-value store, there may not be a need for blocks, unless the system is a hybrid system as described above. Another advantage is that fewer remote procedure calls (RPCs) are needed in the disclosed systems. Because there need not be any blocks in the storage system, and a KV-SSD can store the entire key-value tuple for an application, fewer RPCs are necessary. Embodiments disclosed herein use KV-SSDs to manage metadata on the namenode for client key-value tuples. This has the advantage that traditional block-based storage need not be used for managing the file system namespace, i.e., the value content of client keys represents the metadata, and itself is stored as key-value tuples on the KV-SSD in the namenode. This may remove the dependency on a block-based architecture.

Some embodiments disclosed herein include a native key-value distributed storage system. The system may include a namenode including a KV-SSD. The system may include one or more datanodes each including one or more KV-SSDs. The system may include a client device that is communicatively coupled to the namenode and the one or more datanodes. The client device may include a native key-value storage and networking stack.

In some embodiments, the client device includes an application layer that may be communicatively coupled to the native key-value storage and networking stack. In some embodiments, the client device may be configured to cause to be created a key-value tuple responsive to a call to an operation. In some embodiments, the call to the operation may be made from within the application layer of a client. In some embodiments, the key-value tuple may be stored on the one or more KV-SSDs of the one or more datanodes.

In some embodiments, the key-value tuple may be striped across a first KV-SSD from among the one or more KV-SSDs and a second KV-SSD from among the one or more KV-SSDs. In some embodiments, the striped key-value tuple may include a first internal key-value tuple stored on the first KV-SSD and a second internal key-value tuple stored on the second KV-SSD. In some embodiments, the call to the operation may be a first call to a first operation. In some embodiments, the client device may be configured to cause to be accessed the key-value tuple responsive to a second call to a second operation. In some embodiments, the second call to the second operation may be made from within the application layer.

In some embodiments, the second operation may be at least one of a native key-value get( ) operation or a native key-value put( ) operation. In some embodiments, the client device is configured to cause to be deleted the key-value tuple responsive to a third call to a third operation. The third call to the third operation may be made from within the application layer. In some embodiments, the namenode includes a key-value mapping section including an ordered list of datanodes. In some embodiments, the ordered list of datanodes may include the one or more datanodes. In some embodiments, the ordered list may be a first ordered list. In some embodiments, the first ordered list may be associated with a first key-value tuple. In some embodiments, the key-value mapping section may include a second ordered list of datanodes. In some embodiments, the second ordered list may be associated with a second key-value tuple.

In some embodiments, the namenode includes a space management section configured to at least one of store or track a total capacity of each of the one or more datanodes. In some embodiments, the space management section may be configured to track a used space of each of the one or more datanodes.

In some embodiments, the client device may be configured to natively perform at least one of a create operation, an access operation, or a delete operation associated with a plurality of key-value tuples stored on the one or more datanodes in coordination with the namenode. In some embodiments, the KV-SSD of the namenode may be the same as the one or more KV-SSDs of the one or more datanodes. In some embodiments, the client device may include a remote direct memory access (RDMA) engine. In some embodiments, the one or more datanodes may each include a remote direct memory access (RDMA) engine. In some embodiments, the client device may be configured to cause a direct data transfer of data associated with a key-value tuple using the RDMA engine of the client device and the RDMA engine of the one or more datanodes, without copying the data associated with the key-value tuple through the native key-value storage and networking stack.

Some embodiments disclosed herein may include a hybrid block-based native key-value distributed storage system. The hybrid system may include a namenode including a KV-SSD, one or more first datanodes each including one or more KV-SSDs, and one or more second datanodes each including one or more block-based SSDs. The hybrid system may include a client device that is communicatively coupled to the namenode, the one or more first datanodes, and the one or more second datanodes. The client device may include a hybrid block-based native key-value storage and networking stack.

In some embodiments, the client device may include an application layer that is communicatively coupled to the hybrid block-based native key-value storage and networking stack. In some embodiments, the client device is configured to cause to be created a key-value tuple responsive to a call to a first operation. In some embodiments, the call to the first operation is made from within the application layer. In some embodiments, the key-value tuple can be stored on the one or more KV-SSDs of the one or more first datanodes. In some embodiments, the client device may be configured to cause to be created a block-based file responsive to a second call to a second operation. In some embodiments, the second call to the second operation is made from within the application layer. In some embodiments, the block-based file is stored on the one or more SSDs of the one or more second datanodes.

In some embodiments, the client device is configured to cause to be accessed the key-value tuple responsive to a third call to a third operation. In some embodiments, the third call to the third operation may be made from within the application layer. In some embodiments, the client device may be configured to cause to be accessed the block-based file responsive to a fourth call to a fourth operation. In some embodiments, the fourth call to the fourth operation may be made from within the application layer.

In some embodiments, the client device may be configured to cause to be deleted the key-value tuple responsive to a fifth call to a fifth operation. In some embodiments, the fifth call to the fifth operation may be made from within the application layer. In some embodiments, the client device may be configured to cause to be deleted the block-based file responsive to a sixth call to a sixth operation. In some embodiments, the sixth call to the sixth operation may be made from within the application layer.

The various operations of methods described above may be performed by any suitable means capable of performing the operations, such as various hardware and/or software component(s), circuits, and/or module(s).

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The following discussion is intended to provide a brief, general description of a suitable machine or machines in which certain aspects of the inventive concept can be implemented. Typically, the machine or machines include a system bus to which is attached processors, memory, e.g., RAM, ROM, or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present disclosure can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the present disclosure with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the present disclosure may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this present disclosure as defined in the claims.

What is claimed is:

1. A native key-value distributed storage system, comprising:
   a namenode comprising a key-value mapping section comprising an ordered list of one or more datanodes;
   one or more datanodes comprising one or more key-value storage devices; and
   a client device comprising an application layer communicatively coupled to a native key-value storage and networking stack.

2. The native key-value distributed storage system of claim 1, wherein:
   the client device is configured to cause a key-value tuple to be created based on a call to an operation,
   wherein the call to the operation is made from within the application layer, and
   the key-value tuple is stored on the one or more key-value storage devices of the one or more datanodes.

3. The native key-value distributed storage system of claim 1, wherein a key-value tuple is striped across a first key-value storage device from among the one or more key-value storage devices and a second key-value storage device from among the one or more key-value storage devices.

4. The native key-value distributed storage system of claim 3, wherein the key-value tuple comprises a first internal key-value tuple stored on the first key-value storage device and a second internal key-value tuple stored on the second key-value storage device.

5. The native key-value distributed storage system of claim 2, wherein:
the call to the operation is a first call to a first operation;
the client device is configured to cause to be accessed the key-value tuple based on a second call to a second operation; and
the second call to the second operation is made from within the application layer.

6. The native key-value distributed storage system of claim 5, wherein the second operation is at least one of a native key-value get( ) operation or a native key-value put( ) operation.

7. The native key-value distributed storage system of claim 5, wherein the client device is configured to cause to be deleted the key-value tuple based on a third call to a third operation, wherein the third call to the third operation is made from within the application layer.

8. The native key-value distributed storage system of claim 1, wherein:
the ordered list of datanodes comprises the one or more datanodes.

9. The native key-value distributed storage system of claim 8, wherein:
the ordered list is a first ordered list;
the first ordered list is associated with a first key-value tuple;
the key-value mapping section comprises a second ordered list of datanodes; and
the second ordered list is associated with a second key-value tuple.

10. The native key-value distributed storage system of claim 1, wherein the namenode comprises a key-value storage device, and the key-value storage device of the namenode is the same as the one or more key-value storage devices of the one or more datanodes.

11. The native key-value distributed storage system of claim 1, wherein:
the client device comprises a remote direct memory access (RDMA) engine;
the one or more datanodes comprises a remote direct memory access (RDMA) engine; and
the client device is configured to cause a direct data transfer of data associated with a key-value tuple using the RDMA engine of the client device and the RDMA engine of the one or more datanodes.

12. The native key-value distributed storage system of claim 1, wherein the namenode comprises a space management section configured to at least one of store or track a capacity of at least one of the one or more datanodes.

13. The native key-value distributed storage system of claim 12, wherein the space management section is configured to track a used space of at least one of the one or more datanodes.

14. A native key-value distributed storage system, comprising:
a namenode comprising a key-value storage device;
one or more datanodes comprising one or more key-value storage devices; and
a client device that is communicatively coupled to the namenode and the one or more datanodes, wherein the client device comprises a native key-value storage and networking stack, wherein the client device is configured to natively perform at least one of a create operation, an access operation, or a delete operation associated with a plurality of key-value tuples stored on the one or more datanodes in coordination with the namenode.

15. A hybrid block-based native key-value distributed storage system, comprising:
a namenode comprising a key-value storage device;
one or more first datanodes comprising one or more key-value storage devices;
one or more second datanodes comprising one or more block-based storage devices; and
a client device that is communicatively coupled to the namenode, the one or more first datanodes, and the one or more second datanodes, wherein the client device comprises a hybrid block-based native key-value storage and networking stack,
wherein:
the client device comprises an application layer that is communicatively coupled to the hybrid block-based native key-value storage and networking stack;
the client device is configured to cause to be created a key-value tuple based on a call to a first operation;
the call to the first operation is made from within the application layer;
the key-value tuple is stored on the one or more key-value storage devices of the one or more first datanodes;
the client device is configured to cause to be created a block-based file based on a second call to a second operation;
the second call to the second operation is made from within the application layer; and
the block-based file is stored on the one or more storage devices of the one or more second datanodes.

16. The native key-value distributed storage system of claim 15, wherein:
the client device is configured to cause to be accessed the key-value tuple based on a third call to a third operation;
the third call to the third operation is made from within the application layer;
the client device is configured to cause to be accessed the block-based file based on a fourth call to a fourth operation; and
the fourth call to the fourth operation is made from within the application layer.

17. The native key-value distributed storage system of claim 16, wherein:
the client device is configured to cause to be deleted the key-value tuple based on a fifth call to a fifth operation;
the fifth call to the fifth operation is made from within the application layer;
the client device is configured to cause to be deleted the block-based file based on a sixth call to a sixth operation; and
the sixth call to the sixth operation is made from within the application layer.

* * * * *